Patented May 25, 1954

2,679,494

UNITED STATES PATENT OFFICE 2,679,494

MODIFIED ACRYLONITRILE POLYMERIZATION PRODUCTS AND METHOD OF PREPARATION

Walter M. Thomas, Springdale, Conn., assignor to American Cyanamid Company, New York, N. Y., a corporation of Maine No Drawing. Application May 15, 1951,
Serial No. 226,531

14 Claims. (Cl. 260—45.2)

This invention relates to new and useful compositions of matter and more particularly to modified acrylonitrile polymerization products and to methods of preparing the same. The invention is especially concerned with compositions comprising a water-insoluble polymeric product of reaction of ingredients comprising (1) acrylonitrile, (2) an aldehyde (e. g., formaldehyde, acetaldehyde, glyoxal, paraformaldehyde, etc.), including aldehyde-addition products (e. g., methylol ureas, methylol amides of sebacic and other polycarboxylic acids, etc.) and (3) a nitrogenous substance selected from the class consisting of (a) ammonia and primary and secondary amines and (b) acid-addition salts, e. g., the chlorides, sulfates, acetates, formates, phosphates, bromides, etc., of the compounds of (a). The primary and secondary amines which are used in practicing the present invention have, as also does ammonia, at least one hydrogen atom attached to the amino nitrogen atom. The nitrogenous substance of (3) is further characterized by being reactive in a Mannich reaction (reference: "Organic Reactions," vol. 1, chapter 10, pp. 303–341, Roger Adams, Editor-in-Chief, published in 1942 by John Wiley & Sons, Inc., New York).

In the compositions of the present invention the acrylonitrile of (1) constitutes a major proportion, preferably from about 80% to about 97%, by weight of the total amount of the ingredients of (1), (2) and (3), and the aldehyde of (2), e. g., formaldehyde, and the nitrogenous substance of (3), e. g., morpholine, monoethanolamine, diethanolamine, benzylamine, ammonium chloride, etc., are employed in a molar ratio of from about 0.5 mole to about 5 moles, usually from about 0.9–1 mole to about 1–3 moles, of the former per mole of the latter.

The present invention has, as one of its main objects, the production of new modified acrylonitrile polymerization products which are more readily dyed, especially with acid dyes, than homopolymeric acrylonitrile or many of the copolymers of acrylonitrile and another monomer or monomers that were known or suggested prior to my invention.

Another object of the invention is to prepare modified acrylonitrile polymerization products which can be spun or otherwise shaped to form filaments, tapes, ribbons, rods, tubes, sheets, etc., and the shaped articles then dyed either before or after having been oriented to improve their useful properties.

Other objects of the invention will be apparent to those skilled in the art from the description and examples which follow.

It was suggested prior to my invention that water-soluble nitrogenous products of high molecular weight could be prepared by reacting a water-soluble polymeric amide such as polymethacrylamide, an amine such as dimethylamine, and an aldehyde such as formaldehyde in an acid, neutral or alkaline medium (see, for example, Grimm et. al. Patent No. 2,205,355), and that such products were useful in filling leather, since they formed an insoluble compound with the tanning agent, as well as in dyeing fabrics, particularly cellulosic fabrics, and leather. The compositions of the present invention differ from such prior art compositions in that they are substantially insoluble in water. The preferred compositions are soluble in a concentrated aqueous solution of a water-soluble salt which yields highly hydrated ions in an aqueous solution, for instance in a concentrated aqueous solution of a water-soluble thiocyanate, e. g., sodium or calcium thiocyanate, as well as in certain organic solvents, e. g., dimethyl formamide. In some cases, for instance when a dialdehyde, e. g., glyoxal, is used, the compositions may be partially cross-linked and consequently will exhibit only limited solubility or swelling in these solvents. Because of their water-insolubility and the solubility of the preferred types in certain solvents, they are eminently suitable for use in producing shaped articles, e. g., filaments, sheets, rods, staple fibers, etc., which can be readily dyed, for instance with an acid dye.

The objects of the present invention are accomplished, in general, as briefly described in the first paragraph of this specification. The reaction between the acrylonitrile, aldehyde and Mannich-type nitrogenous substance can be carried out simultaneously with the polymerization of the acrylonitrile, under conditions such as are commonly employed in polymerizing monomeric substance comprising acrylonitrile, for instance as described in the copending application of John A. Price, Serial No. 212,523, filed February 23, 1951, and in the patents and copending applications mentioned therein. Or, instead of producing the modified acrylonitrile polymerization product by polymerizing acrylonitrile while admixed with ingredients comprising an aldehyde and a Mannich-type nitrogenous substance of the kind aforementioned, the water-insoluble, modified acrylonitrile polymerization products of this invention can be produced by first producing a hydroxy-containing partial reaction product of the aldehyde, e. g., formaldehyde, and a Mannich-type nitrogenous substance (for instance, a methylol derivative of the said substance), under acid, alkaline or neutral conditions, and then polymerize the monomeric substance comprising acrylonitrile while admixed with said partial reaction product. When this procedure is followed, the acrylonitrile constitutes from about 80% to about 97% by weight of the total amount of acrylonitrile and the aforesaid partial reaction product, e. g., a methylol derivative such, for instance, as a mono-, di-, tri-, tetra-, penta- or hexamethylol melamine, when the aldehyde is formaldehyde. In producing the partial reaction product, the aldehyde is usually employed in a molar ratio of about 0.5 mole to 5 moles thereof per mole of the aforementioned Mannich-type nitrogenous substance.

For further information on the Mannich reaction and of examples of primary and secondary amines that will participate in such a reaction, reference is again made to the aforementioned Adams' publication, "Organic Reactions, vol. I." Such amines include various primary amines (e. g., methylamine, ethylamine, β-hydroxyethylamine, β - chloroethylamine, allylamine, benzylamine, β-phenylethylamine, ethylenediamine, ethyl aminoacetate, ω-aminoacetophenone, tetrahydro - β - naphthylamine, 3,4-methylenedioxybenzylamine, etc.), various secondary amines (e. g., dimethylamine, diethylamine, diethanolamine, dipropylamine, di-n-butylamine, diisoamylamine, dibenzylamine, methyldiethylethylenediamine, methylaniline, piperidine, 1,2,3,4 - tetrahydroisoquinoline, 6-methoxy - 1,2,3,4 - tetrahydroisoquinoline, morpholine, piperazine, ω-methylaminopropiophenone, β-acetylethylbenzylamine, benzyl-(2-cyclohexanonylmethyl)-amine, 3,4 - methylenedioxybenzyl-(2-cyclohexanonylmethyl) - amine, etc.). Acid-addition salts of such primary and secondary amines, as well as ammonia and ammonium salts, can be used in a Mannich condensation reaction, such as is here under consideration, simultaneously with a reaction involving the polymerization of acrylonitrile. Such salts include the chlorides, bromides, iodides, sulfates, sulfonates, phosphates, borates, cyanides, carbonates, hydrocarbonates, thiocyanates, thiosulfates, isocyanates, sulfites, bisulfites, nitrates, nitrites, oxalates, silicates, sulfides, cyanates, acetates and the other common organic and inorganic salts of ammonia and of primary and secondary amines. When salts are used, they may be preformed before they are incorporoted into the reaction mass or they may be formed in situ by carrying out the reaction in the presence of an acid corresponding to the salt of the base to be employed.

A preferred class of nitrogenous substances within the aforementioned broad class are compounds containing a nitrogen-containing grouping or groupings, preferably not more than three nitrogen-containing groupings, at least one of which is a grouping represented by the formula

where R represents a member of the class consisting of hydrogen and alkyl, cycloalkyl, hydroxyalkyl, hydroxycycloalkyl, aralkyl, aryl and alkaryl radicals. The other nitrogen-containing groupings, if present, can be the same as the grouping just described, or part or all of the remainder can be a grouping represented by the formula

where R' and R'' represent any organic radical, which can be the same or different, more particularly a monovalent hydrocarbon radical, e. g., an aromatic, saturated or unsaturated aliphatic, saturated or unsaturated cycloaliphatic, aliphatic-substituted aromatic or aromatic-substituted aliphatic hydrocarbon radical. Acid-addition salts of the above-defined class of nitrogenous substances also can be used.

In producing my new products, the choice of the aldehyde is dependent largely upon economic considerations and the particular properties desired in the finished product. I prefer to use as the aldehydic reactant formaldehyde or compounds engendering formaldehyde, e. g., paraformaldehyde, hexamethylenetetramine, trioxane, glyoxal, etc. Illustrative examples of other aldehydes that may be employed are acetaldehyde, propionaldehyde, butyraldehyde, heptaldehyde, octaldehyde, acrolein, methacrolein, crotonaldehyde, benzaldehyde, furfural, hydroxyaldehydes (e. g., aldol, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and methylol derivatives, of urea, thiourea, iminourea, and of substituted ureas, thioureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, of the aminodiazines, and of the aminotriazines, e. g., monomethylol melamine and polymethylol melamines (di-, tri-, tetra-, penta- and hexamethylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc. In some cases the aldehyde-addition product can be used as a substitute for all or part of the Mannich-type nitrogenous substance per se, more particularly when it is an aldehyde-addition product of such a nitrogenous substance, and in the presence or absence of additional aldehyde, e. g., formaldehyde.

The reaction is generally carried out in a suitable liquid medium, e. g., water, while the reactants are dissolved or dispersed therein. In some cases the liquid medium may be an organic solvent in which the reactants are dissolved or dispersed while carrying out the reaction. The reaction can be effected at temperatures ranging from 20 or 30° C., preferably at least 35 or 40° C., up to the boiling temperature of the reaction mass if carried out at atmospheric pressure, or up to, for example, 120° or 130° C. if it is effected at superatmospheric pressures. For additional information on conditions under which the polymerization can be effected, see the aforementioned Price copending application Serial No. 212,523, and for further information on conditions normally used in carrying out a Mannich reaction, see the aforementioned publication "Organic Reactions."

The reaction is usually effected while the reactants are admixed with a polymerization catalyst in order to shorten the period of time required for polymerization of the acrylonitrile. Any of the polymerization catalysts which are suitable for use in polymerizing compounds containing an ethylenically unsaturated grouping, specifically a vinyl grouping, can be employed. Among such catalysts are the inorganic peroxy catalysts, e. g., hydrogen peroxide, ammonium persulfate, etc., and the various organic peroxy catalysts, e. g., dilauryl peroxide, benzoyl peroxide, di-tert.-butyl peroxide, etc. Numerous examples of other polymerization catalysts that can be used are given in the above-mentioned Price copending application. The concentration of the catalyst is relatively small, e. g., from, by weight, about 1 part of catalyst per 1000 parts of the monomeric substance comprising acrylonitrile to about 3 or 4 parts of catalyst per 100 parts of the said monomeric substance.

In order that those skilled in the art may better understand how the present invention can be carried into effect, the following examples are given by way of illustration and not by way of limitation. All parts and percentages are by weight.

EXAMPLE 1

A reaction vessel equipped with a stirrer, thermometer and reflux condenser was placed on a 60° C. water bath and was charged, in the indicated order, with the following ingredients in the specified parts:

| | Parts |
|---|---|
| Water | 793.0 |
| Acrylonitrile (containing 3.1% H$_2$O) | 85.0 |
| Aqueous formaldehyde (containing about 37.1% HCHO) | 26.9 |
| Morpholine | 10.0 |
| Ammonium persulfate, (NH$_4$)$_2$S$_2$O$_8$, in 100 parts of water | 2.0 |

The reaction was allowed to proceed with stirring, for 2 hours under the aforementioned conditions, after which the slightly alkaline, water-insoluble, polymeric reaction product was filtered off, washed well with water and dried at 70° C. The dried product was white, and it was obtained in a yield of 52 parts.

In the above formula the formaldehyde and morpholine were used in a molar ratio of about 2.9 moles of the former per mole of the latter.

EXAMPLE 2

Same as in Example 1 with the exception that 10 parts of diethanolamine was used in place of 10 parts of morpholine. The formaldehyde and diethanolamine were used in a molar ratio of about 3.5 moles of the former per mole of the latter. The pH of the aqueous slurry at the end of the 2-hour reaction period was 6, and the yield of dried polymeric reaction product, which was white, amounted to 61 parts. It was insoluble in water.

EXAMPLE 3

Same as in Example 1 with the exception that 10 parts of ammonium chloride was used in place of 10 parts of morpholine, and the amount of aqueous formaldehyde was reduced to 15.1 parts. The formaldehyde and ammonium chloride were used in approximately equal molar ratios. The pH of the aqueous slurry at the end of the reaction period was 3.6. Upon drying, the polymeric reaction product was obtained in a yield of 60 parts. It was white in color and insoluble in water.

Instead of ammonium chloride, an aquivalent amount of ammonia in the form of ammonium hydroxide can be used.

EXAMPLE 4

A smaller reaction vessel than that employed in the preceding examples and which was equipped with a stirrer, thermometer and reflux condenser was charged, in the indicated order, with the following ingredients in the specified parts:

| | Parts |
|---|---|
| Water | 79.3 |
| Acrylonitrile (containing 3.1% H$_2$O) | 8.5 |
| Aqueous formaldehyde (containing about 37.1% HCHO) | 2.7 |
| Benzylamine | 1.0 |
| Ammonium persulfate in 10 parts of water | 0.2 |

The reaction vessel was placed on a 60° C. steam bath, and the reaction was allowed to proceed for 1 hour. The polymeric reaction product was then filtered off, washed with water and dried at 70° C. A white, dried polymeric reaction product, which was insoluble in water, was obtained in a yield amounting to 5.7 parts.

In the above formula the formaldehyde and benzylamine were used in a molar ratio of about 3.6 moles of the former per mole of the latter.

EXAMPLE 5

The same procedure is followed as described under Example 4 with the exception that 1.34 parts benzylamine hydrochloride, in one case, and 1.91 parts of benzylamine sulfate, in another case, are used in place of 1.0 part of benzylamine per se as a starting reactant. Similar results are obtained.

EXAMPLE 6

Same as in Example 4 with the exception that a mixture of 7.5 parts of acrylonitrile and 1 part of methyl acrylate was used instead of 8.5 parts of acrylonitrile, and 1 part of monoethanolamine was used instead of 1 part of benzylamine. The formaldehyde and monoethanolamine were employed in a molar ratio of about 2 moles of the former per mole of the latter. The yield of dried polymeric reaction product was 1.6 parts. It was a white, water-insoluble substance.

EXAMPLE 7

| | Parts |
|---|---|
| Acrylonitrile (containing 3.1% water) | 85.0 |
| 30.8% aqueous solution of glyoxal | 16.2 |
| Morpholine | 5.0 |
| Water | 890.0 |
| Potassium persulfate, K$_2$S$_2$O$_8$, in 100 parts of water | 2.0 | were heated together, with stirring, under reflux at the boiling temperature of the reaction mass for 1 hour, after which the water-insoluble polymeric reaction product was filtered off, washed with water and dried at 70° C. A white, dried product was obtained in a yield amounting to 39 parts.

In the above formula the glyoxal and morpholine were used in a molar ratio of about 1.5 moles of the former per mole of the latter.

EXAMPLE 8

| | Parts |
|---|---|
| Acrylonitrile (containing 3.1% H₂O) | 85.0 |
| Acetaldehyde | 10.0 |
| Morpholine | 10.0 |
| Water | 890.0 |
| 30% aqueous hydrogen peroxide | 5.5 |

Exactly the same procedure was followed as described under Example 7. In this formula the acetaldehyde and morpholine were used in a molar ratio of about 2 moles of the former per mole of the latter. The polymeric reaction product was water-insoluble, and the yield of white, dried product amounted to 18 parts.

EXAMPLE 9

Example 8 is repeated with the exception that 16.9 parts of morpholine acetate is used instead of 10 parts of morpholine as a starting reactant. Similar results are obtained.

EXAMPLE 10

This example illustrates the preparation of homopolymeric acrylonitrile, which was subsequently employed in comparative dye tests with polymeric reaction products of the present invention.

A reaction vessel, equipped with a stirrer, reflux condenser, thermometer and gas-inlet tube, was placed in a constant-temperature bath which was maintained at 35° C. To the vessel was added a solution of 53.0 parts of acrylonitrile, 900 parts of distilled water and 0.029 part of sulfuric acid. A rapid stream of pre-purified nitrogen was passed over the surface of the solution for 30 minutes. The nitrogen flow was then reduced to about one bubble per second. A reduction-oxidation catalyst system ("redox" system) consisting of 1.71 parts of ammonium persulfate and 0.71 part of sodium meta-bisulfite, each dissolved in 50 parts of water, was then added. The solution first became cloudy at the end of 3 minutes, and the polymerization was fairly exothermic for the first half hour. The polymerization was continued for a total of 4 hours at 35° C. The pH of the reaction product was 3.1. The polymer was collected on a Büchner funnel, washed with 1000 parts of distilled water followed by about 160 parts of methanol. The polymer was dried in an oven at 70° C. for about 16 hours. The yield of dry polyacrylonitrile, which was white, amounted to 48 parts.

EXAMPLE 11

Samples of the homopolymeric acrylonitrile of Example 10 and of the polymeric reaction products of Examples 1–4 and 6–8 were subjected to the following dye test:

A sample (10 parts) of the dry polymerization product was added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath was boiled for 30 minutes, after which the polymerization product was filtered off and washed with hot water until the water was free of dye. The polymerization products of Examples 1–4, 6 and 7 were dyed blue, while the polymerization product of Example 3 was greenish in color rather than blue. In marked contrast, the homopolymeric acrylonitrile of Example 10 failed to absorb any dye. The advantage of modifying an acrylonitrile polymerization product by the technique herein disclosed and claimed, thereby to obtain a product of improved dyeability as compared with conventional homopolymeric acrylonitrile, is therefore quite apparent.

Solubility tests also were made on the polymeric reaction products of Examples 1–4 and 6–8. In making these tests 0.5 gram of the polymeric reaction product was stirred at room temperature with 10 ml. of a 55%, by weight, aqueous solution of sodium thiocyanate. All products were soluble in this solution, that of Example 3 giving a very viscous solution indicative of a high-molecular-weight product. The appearances of the solutions were as follows:

| Product of Example | Appearance of Solution |
|---|---|
| 1 | Pale yellow, clear fluid. |
| 2 | Do. |
| 3 | Colorless, nearly a gel. |
| 4 | Pale yellow, opaque fluid. |
| 6 | Pale yellow, clear fluid. |
| 7 | Very pale yellow, clear fluid. |
| 8 | Pale yellow, clear fluid. |

EXAMPLE 12

This example illustrates the preparation of a modified acrylonitrile polymerization product by polymerizing monomeric substance comprising acrylonitrile while admixed with a hydroxy-containing partial reaction product of an aldehyde, specifically formaldehyde, and a nitrogenous substance of the kind employed in practicing the present invention and which is characterized by being reactive in a Mannich reaction, specifically melamine. More particularly this example illustrates the polymerization of acrylonitrile while admixed with a polymethylol melamine, specifically an N-substituted melamine containing an average of three N-methylol groupings per triazine nucleus.

A. Preparation of trimethylol melamine

A reaction vessel was charged with 1008 parts of recrystallized melamine. To this was added a mixture of 1936 parts of 37.1% aqueous formaldehyde and 536 parts of water, the mixture being adjusted to a pH of 9.0 with about 3.6 parts of 20.7% aqueous sodium hydroxide. The resulting slurry was stirred and heated to 78° C. in 7 minutes, at the end of which period of time a clear solution had formed. Nine minutes later the temperature reached 96° C. Heating was now discontinued and the syrupy reaction product was filtered at 80° C. The syrupy filtrate was diluted with 666 parts of water and adjusted to a pH of 9.1 with about 0.7 part of 20.7% aqueous sodium hydroxide. The resulting material was cooled rapidly to 10°–20° C. accompanied by slow stirring, and then was allowed to crystallize over a period of 3 days. The crystalline reaction product comprising trimethylol melamine was centrifuged and then dried at 50° C. The yield of product amounted to 1226 parts.

B. Reaction of acrylonitrile and trimethylol melamine

The same procedure was followed as described under Example 10 with the exception that 10.8 parts of trimethylol melamine, prepared as above described, was added to the reaction vessel along with the 53 parts of acrylonitrile, 900 parts of distilled water and 0.029 part of sulfuric acid. The same reduction-oxidation catalyst system and polymerization technique were used as described under Example 10. The polymerization and reaction between the acrylonitrile and trimethylol melamine were continued for a total of 4 hours at 35° C. The pH of the aqueous slurry at the end of the reaction period was 6.1. The polymeric reaction product was isolated from the reaction mass, washed and dried in the same manner as that employed in preparing the homopolymeric acrylonitrile of Example 10. The yield of dry polymeric reaction product, which was a white, granular solid that was soluble in dimethyl formamide, amounted to 13 parts.

A sample of this polymeric reaction product was tested for its dyeability in the same manner as described under Example 11. It was readily dyed. This was in marked contrast to the homopolymeric acrylonitrile of Example 10 which failed to absorb any dye.

It will be understood, of course, by those skilled in the art that my invention is not limited to the specific ingredients named in the above illustrative examples nor to the particular proportions and methods mentioned therein. Thus, instead of the catalyst or reduction-oxidation (redox) catalyst system named in the different examples, any other polymerization catalyst or combination of polymerization catalysts, examples of which have been given hereinbefore and in the aforementioned Price copending application Serial No. 212,523, can be used.

Likewise, other modifying comonomers, in addition to the methyl acrylate named in Example 6, can be used. Illustrative examples of such comonomers are vinyl compounds which are different from acrylonitrile (vinyl cyanide), including the vinyl aromatic compounds, more particularly the vinyl aromatic hydrocarbons (e. g., styrene, isopropenyl toluene, the various dialkyl styrenes, etc.), other aliphatic compounds containing a $CH_2=C<$ grouping, e. g., the various substituted acrylonitriles (e. g., methacrylonitrile, ethacrylonitrile, phenylacrylonitrile, etc.), acrylamide and the various substituted acrylamides (e. g., methacrylamide, ethacrylamide, the various N-substituted acrylamides and N-substituted alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

The proportions of any modifying comonomer or comonomers that are incorporated in the reaction mass together with the acrylonitrile and the other aforementioned reactants can be rather widely varied. Ordinarily, however, the acrylonitrile constitutes a major or preponderant proportion (more than 50%), for example upon to 95%, by weight of the total weight of monomers, and the aldehyde and the Mannich-type reactant in the aforementioned molar ratios constitute from about 80% to about 97% by weight of the total amount of acrylonitrile, aldehyde and Mannich-type reactant.

Although the new compositions of this invention are particularly useful in the formation of fibers or filaments which are more amenable to dyeing than homopolymeric acrylonitrile, they also have numerous other applications in the plastics and coating arts. For instance, with or without a filler or other additive, they may be used as molding compositions (or as components of molding compositions) from which molded articles are produced by molding the compositions under heat and pressure, e. g., at temperatures of the order of 130° C. or 140° C. to 200° C. and under pressures up to 10,000 pounds or more per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

I claim:

1. A composition comprising a water-insoluble polymeric product of reaction of ingredients consisting essentially of (1) monomeric acrylonitrile, (2) an aldehyde and (3) a nitrogenous substance selected from the class consisting of (a) ammonia and primary and secondary amines and (b) acid-addition salts of the compounds of (a), said nitrogenous substance being further characterized by being reactive in a Mannich reaction, and said acrylonitrile of (1) being polymerized in the presence of the other reactive material and constituting from about 80% to about 97% by weight of the total amount of the ingredients of (1), (2) and (3), and the ingredients of (2) and (3) being employed in a molar ratio of from about 0.5 mole to about 5 moles of the former per mole of the latter.

2. A composition as in claim 1 wherein the aldehyde of (2) is formaldehyde.

3. A composition as in claim 1 wherein the nitrogenous substance of (3) is morpholine.

4. A composition as in claim 1 wherein the nitrogenous substance of (3) is monoethanolamine.

5. A composition as in claim 1 wherein the nitrogenous substance of (3) is diethanolamine.

6. A composition as in claim 1 wherein the nitrogenous substance of (3) is benzylamine.

7. A composition as in claim 1 wherein the nitrogenous substance of (3) is ammonium chloride.

8. The method of producing a modified acrylonitrile polymerization product which comprises polymerizing (1) monomeric acrylonitrile while admixed with ingredients comprising (2) an aldehyde and (3) a nitrogenous substance selected from the class consisting of (a) ammonia and primary and secondary amines and (b) acid-addition salts of the compounds of (a), said nitrogenous substance being further characterized by being reactive in a Mannich reaction, and said acrylonitrile of (1) constituting from about 80% to about 97% by weight of the total amount of the ingredients of (1), (2) and (3), and the ingredients of (2) and (3) being employed in a molar ratio of from about 0.5 mole to about 5 moles of the former per mole of the latter.

9. A method as in claim 8 wherein the polymerization is effected in an aqueous medium with the aid of a polymerization catalyst.

10. The method of producing a modified acrylonitrile polymerization product which comprises polymerizing (1) monomeric acrylonitrile while admixed with ingredients comprising (2) formaldehyde and (3) a nitrogenous substance selected from the class consisting of (a) ammonia and primary and secondary amines and (b) acid-addition salts of the compounds of (a), said nitrogenous substance being further characterized by being reactive in a Mannich reaction, and said acrylonitrile of (1) constituting from about 80% to about 97% by weight of the total amount of the ingredients of (1), (2) and (3), and the ingredients of (2) and (3) being employed in a molar ratio of from about 0.5 mole to about 5 moles of the former per mole of the latter.

11. A method as in claim 10 wherein the nitrogenous substance of (3) is morpholine.

12. The method of producing a modified acrylonitrile polymerization product which comprises polymerizing, in an aqueous medium with the aid of a polymerization catalyst, (1) monomeric acrylonitrile while admixed with ingredients comprising (2) formaldehyde and (3) a nitrogenous substance selected from the class consisting of (a) ammonia and primary and secondary amines and (b) acid-addition salts of the compounds of (a), said nitrogenous substance being further characterized by being reactive in a Mannich reaction, and said acrylonitrile of (1) constituting from about 80% to about 97% by weight of the total amount of the ingredients of (1), (2) and (3), and the ingredients of (2) and (3) being employed in a molar ratio of from about 0.5 mole to about 5 moles of the former per mole of the latter; and isolating the resulting modified acrylonitrile polymerization product.

13. The method of producing a modified acrylonitrile polymerization product which comprises polymerizing monomeric substance comprising (1) acrylonitrile while admixed with (2) an N-carbinol compound which is partial reaction product of (a) an aldehyde and (b) a nitrogenous substance selected from the class consisting of (A) ammonia and primary and secondary amines and (B) acid-addition salts of the compounds of (A), said nitrogenous substance being further characterized by being reactive in a Mannich reaction, and said acrylonitrile of (1) constituting from about 80% to about 97% by weight of the total amount of (1) and (2), and the ingredients of (a) and (b) being employed in a molar ratio of about 0.5 mole to about 5 moles of the former per mole of the latter.

14. A method as in claim 13 wherein the aldehyde of (a) is formaldehyde.

References Cited in the file of this patent

UNITED STATES PATENTS

| Number | Name | Date |
|---|---|---|
| 2,352,671 | Walker | July 4, 1944 |
| 2,416,536 | Neher et al. | Feb. 25, 1947 |
| 2,476,065 | Robinson | July 12, 1949 |
| 2,552,327 | Kropa | May 8, 1951 |

FOREIGN PATENTS

| Number | Country | Date |
|---|---|---|
| 716,322 | Germany | Jan. 20, 1942 |